US008588965B2

(12) United States Patent
Hudis

(10) Patent No.: US 8,588,965 B2
(45) Date of Patent: *Nov. 19, 2013

(54) SYSTEM AND METHOD FOR AUTO-MACHINE MENU CONFIGURATION

(75) Inventor: Scott Hudis, Washington County, MN (US)

(73) Assignee: Crane Merchandising Systems, Inc., Bridgeton, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/443,708

(22) Filed: Apr. 10, 2012

(65) Prior Publication Data

US 2012/0259459 A1 Oct. 11, 2012

Related U.S. Application Data

(63) Continuation of application No. 12/380,924, filed on Mar. 5, 2009, now Pat. No. 8,155,785.

(51) Int. Cl.
*G06F 17/00* (2006.01)

(52) U.S. Cl.
USPC ............ 700/241; 700/242; 700/244; 700/236

(58) Field of Classification Search
USPC .................................. 700/236, 241, 242, 244
See application file for complete search history.

(56) References Cited

U.S. PATENT DOCUMENTS

| | | | | |
|---|---|---|---|---|
| 5,450,938 A | 9/1995 | Rademacher | | |
| 5,947,328 A | 9/1999 | Kovens et al. | | |
| 6,059,142 A * | 5/2000 | Wittern et al. | ................ | 700/238 |
| 6,401,010 B1 | 6/2002 | Takahashi | | |
| 7,515,989 B2 | 4/2009 | Yoshizaki | | |
| 7,885,724 B2 | 2/2011 | Ochi | | |
| 8,155,785 B2 * | 4/2012 | Hudis | ........................... | 700/241 |

* cited by examiner

*Primary Examiner* — Timothy Waggoner

(57) ABSTRACT

A system and method for providing a satellite vend operation. A first (parent) vending machine is operable to dispense a product from a product storage display area located in a second (child) vending machine. The first (parent) vending machine can control or interact with the functions of the second (child) vending machine. A programming menu on the first (parent) vending machine is automatically configured for a satellite vend operation when the first (parent) vending machine pairs with the second (child) vending machine. An operator is provided, in the programming menu located on the parent vending machine, relevant information associated with the child vending machine and relevant information associated with the parent vending machine.

20 Claims, 5 Drawing Sheets

SYSTEM AND METHOD FOR AUTO-MACHINE MENU CONFIGURATION

CROSS-REFERENCE TO RELATED APPLICATIONS

This application is a continuation of U.S. patent application Ser. No. 12/380,924, filed Mar. 5, 2009 which issued on Apr. 10, 2012 as U.S. Pat. No. 8,155,785, entitled "SYSTEM AND METHOD FOR AUTO-MACHINE MENU CONFIGURATION." U.S. Pat. No. 8,155,785 is assigned to the assignee of the present application and is incorporated by reference into this disclosure as if fully set forth herein. This disclosure hereby claims priority under 35 U.S.C. §120 to U.S. Pat. No. 8,155,785.

TECHNICAL FIELD

This disclosure is generally directed to consumer product vending machines and more particularly to systems and methods for interfaces for vending machines.

BACKGROUND

A vending machine is a machine that provides various snacks, beverages and other products to consumers by vending products without a cashier. Items sold via vending machines can vary by country and region. Vending machines typically utilize a push button interface that is capable of accepting money in paper or coin form. A consumer may insert coins into a coin acceptor or dollar bills into a bill validator, or a combination of the two. Thereafter, the consumer typically makes a product selection by entering a product identifying code into a keypad on the face of the vending machine. If the amount of money recognized by the machine equals or exceeds the amount of money required to purchase the selected product, the machine proceeds to vend the product to the consumer. However, if the consumer has not entered enough money, or the machine not recognized the entry of enough money, no product will be vended to the consumer.

SUMMARY

This disclosure provides a system and method for providing a consumer a satellite vending machine system. This disclosure also provides a system and method for wireless communication between and among vending machines and between vending machines and operational management and service controllers.

A vending machine system is provided. The vending machine system includes a first vending machine and a second vending machine capable of controlling the functions of a second vending machine. The second vending machine is capable of dispensing a product from a second vending machine product area in response to commands received from the first vending machine. The first vending machine also is configured to automatically configure a programming menu when paired with the second vending machine.

An apparatus for vending products to a consumer is provided. The apparatus includes a product storage area; a computer readable medium; and a plurality of instructions wherein at least a portion of the plurality of instructions is storable in the computer readable medium. Using the plurality of instructions causes the apparatus to automatically configure a programming menu to enable control of at least one function of a child vending machine. Further, the plurality of instructions causes the apparatus the control the at least one function of the child vending machine.

A method for vending products is provided. The method includes receiving configuration information from a child vending machine and programming a menu automatically, wherein the configuration information is used to program the menu. A menu is provided for programming a satellite vending system wherein a parent vending machine controls the functions of a child vending machine.

Other technical features may be readily apparent to one skilled in the art from the following figures, descriptions and claims.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure provides a system and method providing a satellite vending system for a combined vending machine transaction. This disclosure also provides a system and method for a menu configuration for satellite vending machines. This disclosure also provides a system and method for wireless communication between and among vending machines and between vending machines and operational management and service controllers.

Figure 1:
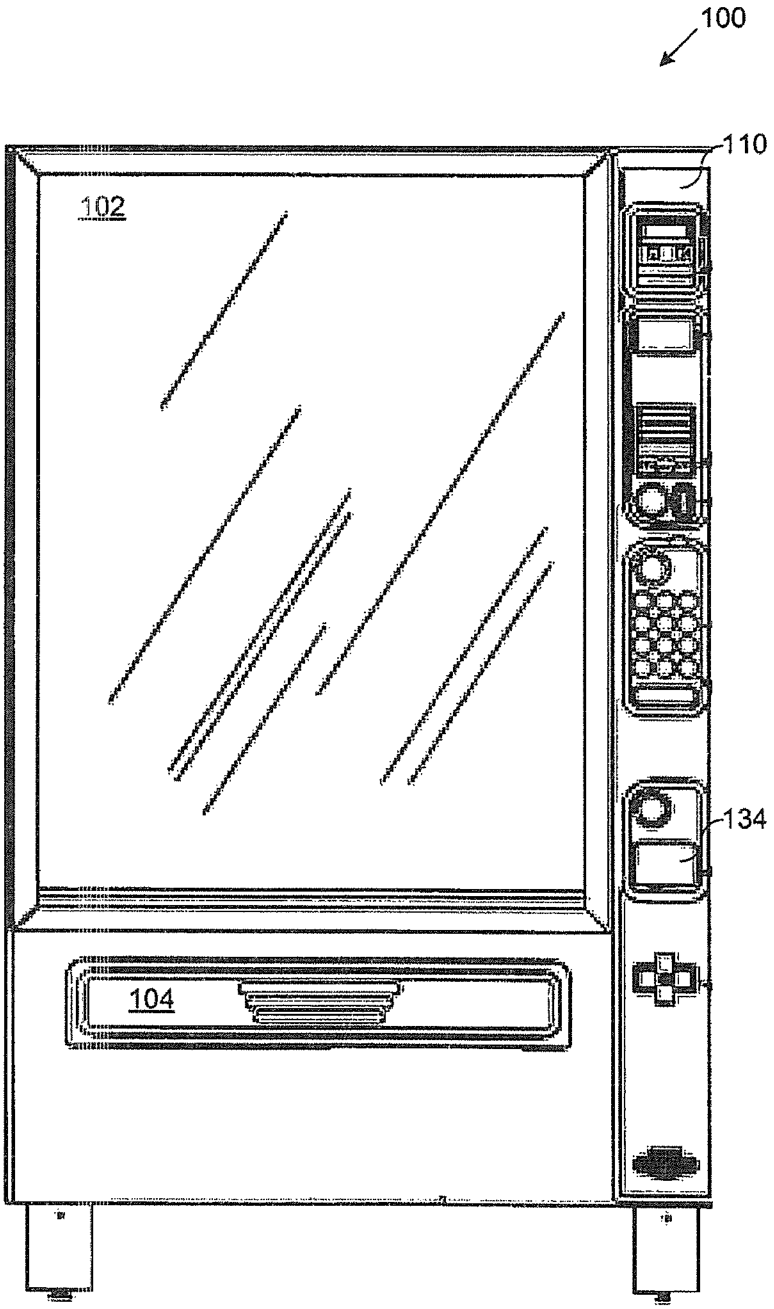
FIG. 1 is a somewhat simplified illustration of a vending machine according to embodiments of the present disclosure.

FIG. 1 is a somewhat simplified illustration of a vending machine 100 according to one embodiment of the present disclosure. The embodiment of the vending machine 100 shown in FIG. 1 is for illustration only. Other embodiments of the vending machine 100 could be used without departing from the scope of this disclosure.

The vending machine 100 has a product display and storage area 102 and a delivery door 104. Additionally, the vending machine 100 has a user interface area 110 and a change return tray 134. Depiction of the user interface area 110 along one side of the face of the vending machine 100 is exemplary only and should not be construed as limited to this configuration. The user interface area 110 may be located along the left side of the face of the vending machine 100. Additionally or alternatively, the user interface area 110 may be located in any other user-accessible portion of the vending machine 100. While shown adjacent to each other, in other embodiments, subsections of the user interface 110 may be located in different portions (split or separated) of the vending machine 100. The vending machine 100 may be configured to dispense a number of different products as is known in the art, including, but not limited to, beverages, snacks, electronic devices, cigarettes, and music recordings.

Figure 2:
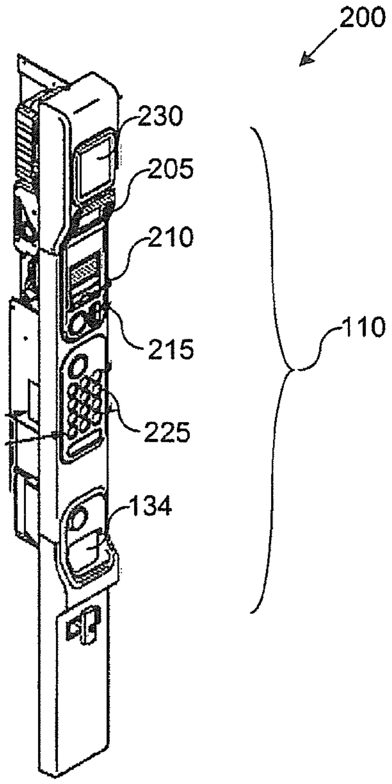
FIG. 2 illustrates a user interface area according to embodiments of the present disclosure.

Referring now to FIG. 2, the user interface area (hereinafter "UI") 110 is illustrated in more detail. The embodiment of the UI 110 shown in FIG. 2 is for illustration only. Other embodiments of the UI 110 could be used without departing from the scope of this disclosure.

The UI 100 is disposed on a front face of a control carriage 200 (also referred to as a "monetary slide"). The UI 110 includes a card validator 205, a bill validator 210, and a coin insert 215. Although only these three monetary inputs are shown, it should be understood that any suitable manner and method of payment may be incorporated as is known in the art or hereinafter discovered. Further, embodiments incorporating two or less of the card validator 205, the bill validator 210, and the coin insert 215 could be used without departing from the scope of the disclosure.

Figure 3:
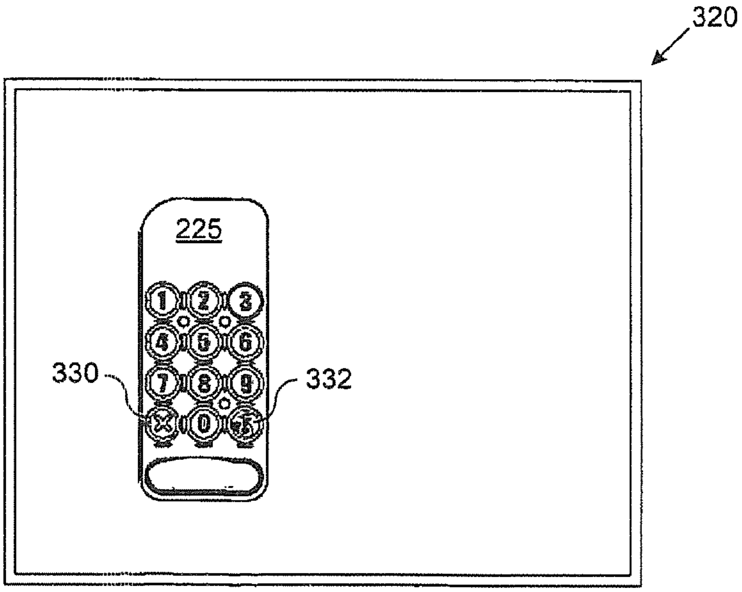
FIG. 3 illustrates a user interface guide according to embodiments of the present disclosure.

In some embodiments, illustrated in FIG. 3, the UI 110 also includes a user interface guide 320 (hereinafter "UI guide"). The UI guide 320 may be one (1) unit or may be separated into two (2) or three (3) units. In some embodiments, the UI guide 320 is a single touch screen display or multiple touch screen displays. In some embodiments, the UI guide 320 includes one or more illuminating indicators (not shown). The one or more illuminating indicators may be a visual Light Emitting Diode (hereinafter "LED") display. Use of an LED is exemplary and it should be understood that other light emitting sources, such as, but not limited to, incandescent, plasma and fiber-optic sources may be utilized. Different ones of the illuminating indicators may utilize different source technologies and display through different wavelength spectrums (i.e., different illuminating indicators may each appear to be a different color as light is emitted or reflected via a different wavelength).

The UI 110 includes a customer keypad 225. The customer keypad 225 includes a plurality of buttons responsive to physical contact by the consumer. The customer keypad 225 may be a standard numeric keypad or it may be an alphanumeric keypad. The buttons of the customer keypad 225 are adapted to be illuminated by LED or sources such as, but not limited to, incandescent light and fiberoptic. Each one of the plurality of buttons includes a character, or characters. In one embodiment, the character on each of the plurality of buttons is opaque while the remaining area of each of the plurality of button illuminates. In alternate embodiments, the character illuminates while the remaining area of the button is opaque. Additionally, in some embodiments, the customer keypad 225 is displayed within the touch screen display. Further, the buttons of the customer keypad are configured to be of such a size and shape so as to assist a customer in readily recognizing and contacting each one of the plurality of buttons. For example, the buttons of the customer keypad 225 may be large round buttons as well as being illuminated.

In some embodiments, the customer keypad 225 is responsive to programming such that, upon the initiation of a selection by the customer, the button, or the area representing the button if part of a touch screen display, illuminates and may remain illuminated. For example, if the customer presses a number on the customer keypad 225, the number pressed is illuminated. The characters selected by the customer may remain illuminated until the customer confirms the selection. Additionally, the characters selected by the customer may be displayed on a video display 230.

In yet additional and alternative embodiments, the keypad 225 is included in the UI Guide 320. In such embodiments, the UI Guide 320 is operable to emphasize a selected number upon selection by the customer. For example, the UI Guide 320 can increase the size of the number selected or change the color of the number selected. Additionally, the UI Guide 320 is operable to maintain an emphasis on the numbers selected by the customer until the vend transaction is complete.

In some embodiments, the video display 230 is a two (2) inch by three and a half (3.5) inch graphic display. The display 230 shows how much money has been entered and may have an internal program for idle periods. The display 230 provides a visual indication of which product identification characters have been entered. Upon entry of the last character of the product identifier, the display 230 directs the customer to confirm their selection. For example, if the product identifiers are three-digit numbers, upon entering the third number, the display 230 directs the customer to press a specified button on the keypad 225. Further, if a selected product fails to be dispensed, the display 230 directs the customer to make another selection.

In some embodiments, after a last character of a product identifier is entered by the customer, the display 230 may prompt the customer to confirm their product selection. Additionally, if the product is unavailable, the display may prompt the customer to make another production selection or request a refund. After confirming the customer's product selection, the vending machine 100 commences a vend process.

In the vend process, the vending machine 100 cycles a dispensing mechanism (not shown) corresponding to the product identifier in order to release the selected product. As the product is released from a product tray (not shown), the product is deposited into a delivery bin (not shown). The vended product within the delivery bin is accessible via the delivery door 104.

In the event that the customer determines that the correct product identifier was not entered, the customer may press (i.e. physically contact) a cancel key 330. The cancel key 330 is included within the keypad 225. In some embodiments, the cancel key 330 is located proximate the keypad 225 or in another location. In some embodiments, the cancel key 330 is responsive to programming such that the cancel key 330 illuminates upon the entry of any character of a product identifier. Selection of the cancel key 330 removes the entry of the product identifier from a memory (discussed in more detail herein below with respect to FIG. 4) and from the display 230.

Additionally, at any time prior to confirming the selection, the customer may request that the vending machine 100 return the customer's money by depressing a coin return key 332.

The coin return key 332 is included within the customer keypad 225. In some embodiments, the coin return key 332 is located proximate the customer keypad 225 or in another user-accessible location. In some embodiments, the coin return key 332 is responsive to programming such that the coin return key 332 illuminates upon the entry of money into the coin insert 215. Selection of the coin return key 332 removes the entry of the product identifier from a memory, if entered (discussed in more detail herein below with respect to FIG. 4). Pressing the coin return key 332 causes the vending machine 100 to return any money inserted into the coin insert 215. In some embodiments, depressing the coin return key 332 results in the vending machine 100 cancelling the initiation of any transaction resulting from reading a credit card into the card validator 205 or returning any bills inserted into the bill validator 210 (and/or returning coins).

In some additional and alternative embodiments, if the customer inserts more money than is required to purchase the desired product, the display 230 is responsive to programming such that the display 230 informs the customer that excess money (i.e. change from the sale) has been, or will be, returned to the customer. For example, the customer inserts $1.00 and selects a product for sale at 75 cents. In response, the product is dispensed, 25 cents is placed in the coin return tray 134 and the display instructs the customer that the 25 cents has been placed in the return tray 134.

Figure 4:
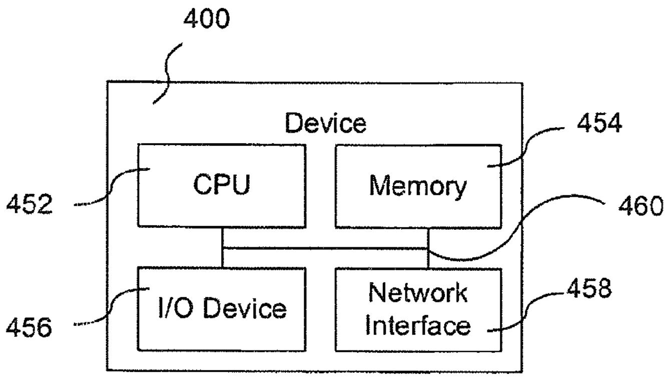
FIG. 4 illustrates a vending machine controller 400 according to embodiments of the present disclosure.

FIG. 4 illustrates a vending machine controller 400 according to embodiments of the present disclosure. The embodiment of the vending machine controller 400 shown in FIG. 4 is for illustration only. Other embodiments of the vending machine controller 400 could be used without departing from the scope of this disclosure.

The controller 400 that functions to control or operate the UI guide 220, may be a computer, or any other device capable of transmitting, processing, and/or receiving signals via wireless and/or wireline communication links. The controller 400 includes a central processing unit ("CPU") 452, a memory unit 454, an input/output ("I/O") device 156, and a network interface 458. The network interface may be, for example, one or more network interface cards (NICs) that are each associated with a media access control (MAC) address. The components 452, 454, 456, and 458 are interconnected by one or more communication links 460 (e.g., a bus). It understood that the controller 400 may be configured differently and that each of the listed components may actually represent, or include, several different components. For example, the CPU 452 may actually represent a multi-processor or a distributed processing system; the memory unit 454 can be a computer readable medium and may include different levels of cache memory, main memory, hard disks, and/or remote storage locations; and the I/O device 456 may include displays, keyboards, and the like. Alternatively, a single component may be utilized for two or more of the components illustrated. The network interface 458 enables the controller 400 to connect to a network, such as the wireless network of FIG. 7 or a wireline network.

Memory unit 454 includes programming instructions stored therein and adapted to be utilized by the CPU 452 to control the UI 110 through the operation of a satellite vending system (discussed in further detail herein below with respect to FIG. 5), the display 230, customer keypad 225, cancel key 330, and coin return key 332. Memory unit 454 is further adapted to store inputs received from the customer keypad 225 for illustration of selected product via display 230 and illumination of depressed characters on customer keypad 225.

Figure 5:
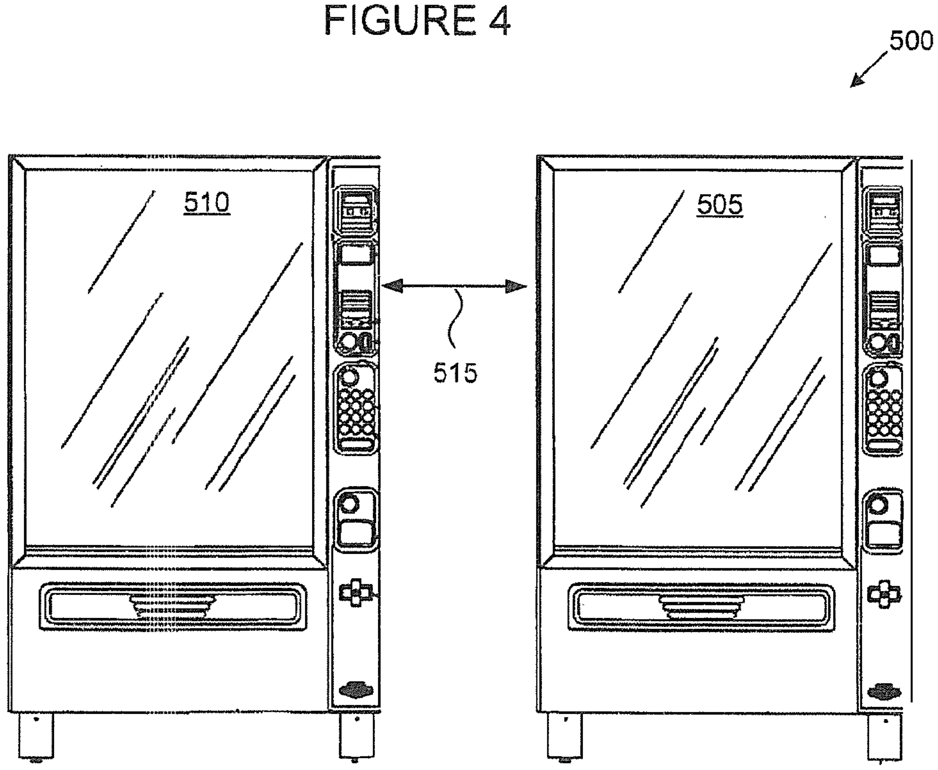
FIG. 5 illustrates a satellite vending system 500 according to embodiments of the present disclosure.

FIG. 5 illustrates a satellite vending system 500 according to embodiments of the present disclosure. The embodiment of the satellite vending system 500 shown in FIG. 5 is for illustration only. Other embodiments of the satellite vending system 500 could be used without departing from the scope of this disclosure.

The satellite vending system 500 includes a parent (master) vending machine 505 and a child (slave) vending machine 510. Parent vending machine 505 and child vending machine 510 can be the same general structure and functionality as the vending machine 100. In one illustrative example, the parent vending machine 505 is configured to dispense soft drinks and the child vending machine 510 is configured to dispense snacks. It will be understood that illustration of the parent vending machine 505 is configured to dispense soft drinks and the child vending machine 510 is configured to dispense snacks is by way of example only, and many other configurations could be used without departing from the scope of this disclosure.

The child vending machine 510 is coupled to the parent vending machine 505 through a bidirectional communication link 515. The communication link 515 can be a wired connection (e.g., a wireline link) and/or a wireless connection (e.g., wireless link): such a wireless link may include, but not is limited to, an infrared or Radio Frequency (RF) or other RF including wireless communications in accordance with Wireless Fidelity (WiFi) IEEE 802.11, IEEE 802.16 (referred to as a "WiMAX") Bluetooth connection, or any other suitable wireless communications interface standard. The communication link 515 enables the controller 400 of the parent vending machine 505 to communicate with the controller 400 of the child vending machine 510 and vice versa.

The parent vending machine 505 is adapted to be paired with the child vending machine 510. When paired, the parent vending machine 505 is operable to control or interact with the functions of the child vending machine 510. For example, the parent vending machine 505 is able to receive selection requests from a customer via keypad 225 for purchases of products located in the child vending machine 510. The parent vending machine 505 can receive money for the purchase of products located in the child vending machine 510. Additionally, the parent vending machine 505, by transmitting commands to the child vending machine 510, can direct the child vending machine 510 to vend the selected product to the customer. The commands transmitted by the parent vending machine 505 can include a product position identifier indicated a position of a product to be dispensed and/or one or more instructions to operate mechanisms necessary to dispense the selected product. Further, the parent vending machine 505 can maintain an inventory of products in the child vending machine 510. It will be understood that these functions are illustrated for example purposes only and should not be construed as limiting.

Accordingly, the parent vending machine 505 is configured to control, or interact with, vending operations of the child vending machine 510. Accordingly, the memory 454 in the parent vending machine controller 400 includes a plurality of instructions stored therein and configured to cause the parent vending machine 505 to transmit commands to the child vending machine 510 to direct the child vending machine 510 to vend a product to a customer (e.g., place a selected product in the child vending machine's product delivery bin).

In some embodiments, the parent vending machine 505 can direct the functions of the child vending machine 510 by transmitting commands to the controller 400 in the child vending machine 510. The child vending machine 510 is configured to conduct vending operations in response to receiving the commands transmitted by the parent vending machine 505. Accordingly, the memory 454 in the child vending machine controller 400 includes a plurality of instructions stored therein configured to cause the child vending machine 510 to receive commands from the parent vending machine 505 that direct the child vending machine 510 to vend a product to a customer (e.g., place a selected product in the child vending machine's 510 product delivery bin).

In some embodiments, the parent vending machine 505 can direct the functions of the child vending machine 510 by transmitting commands directly to components (e.g., actuators and/or gears necessary to dispense products) within the child vending machine 510. The child vending machine 505 acts as a second, or remote, product display and storage area 102 for the parent vending machine 510. The parent vending machine 500 cycles a dispensing mechanism, in the child vending machine 510, corresponding to the product identifier entered by the customer in order to release the selected product. As the product is released from a product tray, the product is deposited into the child vending machine 510 delivery bin (not illustrated). The product within the delivery bin is accessible via the delivery door 104 of the child vending machine 510.

In some embodiments, the child vending machine 510 transmits vending operation information to the parent vending machine 505. The vending operation information includes, but is not limited to, current inventory, vend tray status, vending machine status, vend operation status, and/or other vending machine related information as is known in the art or hereinafter designed. The child vending machine 510 can transmit the vending operation information when the child vending machine 510 initially pairs with the parent vending machine 505. Additionally, the child vending machine 510 can transmit the vending operation information periodically at specified intervals, at the initiation of a vending operation, at the completion of a vending operation, when queried by the parent vending machine, or any combination of the above.

The parent vending machine 505 can receive the vending operation information from the child vending machine 510 when initially paired to the child vending machine 510. Additionally, the parent vending machine 505 can receive the vending operation information in response to a vending operation, prior to a vending operation, in response to a query from the parent vending machine 505, or any combination of the above. Additionally, the parent vending machine 505 can send a request for vending operation information periodically at specified intervals, at a specified time each day, or in response to a triggering event.

One example of the triggering event can be the selection of a specified number of products. In such example, the parent vending machine 505 requests vending operation information after "n" number of products have been selected. The "n" number of products may have been selected during a single transaction or over multiple transactions.

Another example of the triggering event can be a request from an operator requesting status from the parent vending machine 505 and child vending machine 510. In such example, the operator transmits a status request message to the parent vending machine 505. In response, the parent vending machine 505 transmits a request for vending operation information from the child vending machine 510. After receiving the vending operation information from the child vending machine 510, the parent vending machine 505 formats the information and transmits a status response message to the operator.

In one embodiment, the parent vending machine 505 maintains a record of the vending operation information in the memory 454 of the parent vending machine 505. The parent vending machine 505 is able to adjust the vending operation information (e.g., change inventory amounts) in response to a vending operation. For example, in the event that the consumer selects a product located in the child vending machine 510 by entering a product identifier corresponding to the product in the child vending machine 510, the parent vending machine 505 adjusts a quantity of the selected product that is stored in the memory 454 of the parent vending machine 505 as part of the vending operation information associated with the child vending machine 510.

Figure 6:
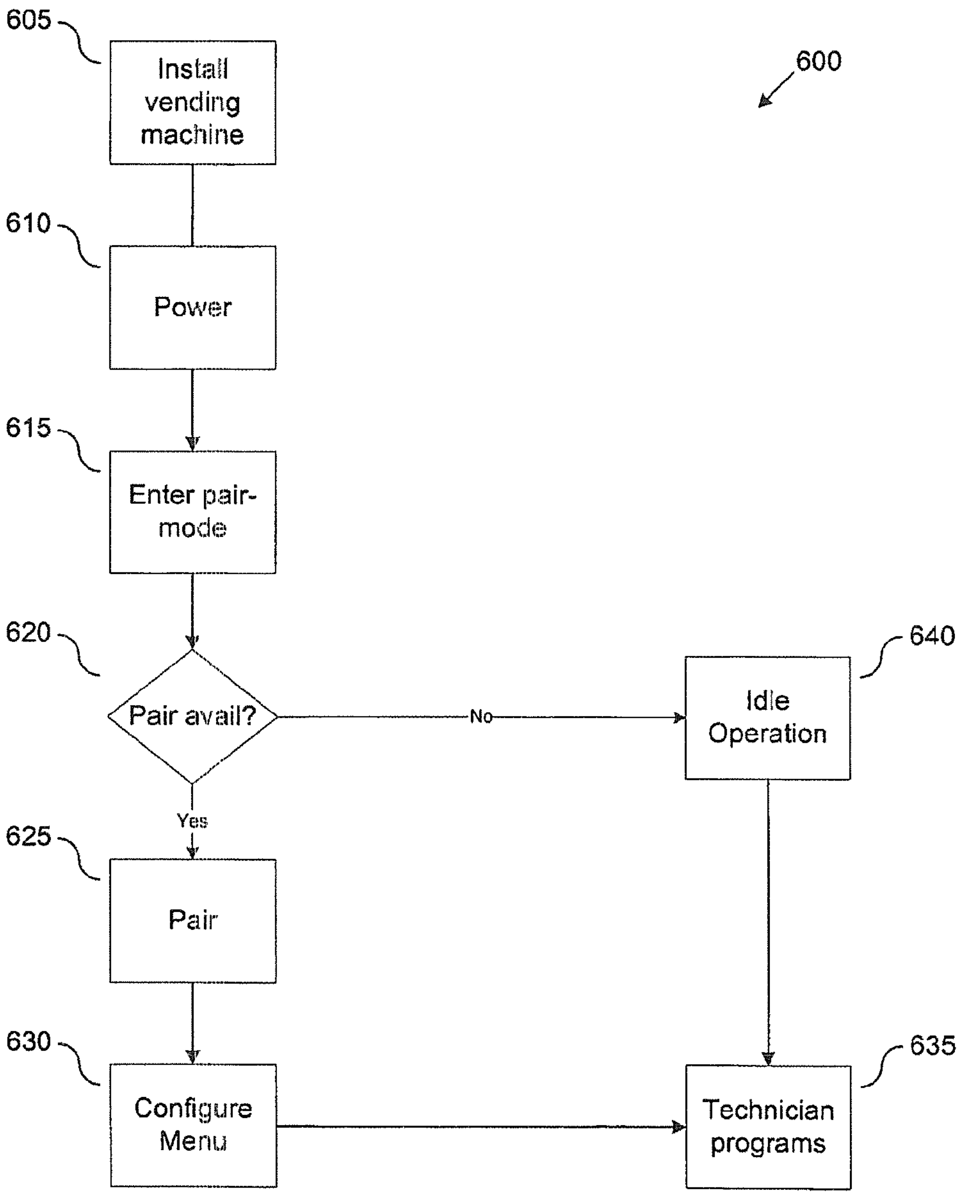
FIG. 6 illustrates a pairing operation in accordance with embodiments of the present disclosure.

FIG. 6 illustrates a pairing operation in accordance with embodiments of the present disclosure. The embodiment of the pairing operation 600 shown in FIG. 6 is for illustration only, and other embodiments of the pairing operation 600 could be used without departing from the scope of this disclosure.

A technician installs the parent vending machine 505 and child vending machine 510 in proximity to each other (step 605). The technician may have just installed both vending machines 505 and 510 at a new location. Additionally, the technician may have installed a single new vending machine, such as child vending machine 510, in proximity to an existing vending machine, such as parent vending machine 505. It will be understood that illustration of the child vending machine 510 as the newly installed vending machine and the parent vending machine 505 as the existing vending machine is for example purposes only. Embodiments wherein the parent vending machine 505 is the newly installed vending machine and the child vending machine 510 is the existing vending machine could be used without departing from the scope of this disclosure.

The technician powers-up the newly installed vending machine(s) (step 610). The technician may power the newly installed vending machine(s) via a power switch, or by connecting an electrical power cord into a power socket, or any other means of supplying power to the vending machines.

The parent vending machine 510 enters a pair mode by the technician connecting a cable from a communication port on the parent vending machine 505 to a communication port on the child vending machine 510 (step 615). The parent vending machine 510 also can enter pair mode by the technician entering a command, via UI 110 on the parent vending machine 505, instructing the parent vending machine 505 to enter pair mode, or automatically upon power-up, without input from the technician. In some embodiments, the parent vending machine 505 transmits pairing request signals upon entering pairing mode.

In pair mode, the parent vending machine 505 determines if a child vending machine 510 is in proximity to be paired (step 620). The parent vending machine 505 determines if a child vending machine 510 is in proximity, without interaction required by the technician, by detecting signals from the child vending machine 510 via communication link 515. The child vending machine 510 transmits the signals in response to pairing request signals received from the parent vending machine 505 or upon power-up.

In the event that the child vending machine 510 is in a proximity to be paired, the parent vending machine 505 pairs with the child vending machine 510 (step 625). The parent vending machine 505 and the child vending machine 510 exchange synchronization and configuration information automatically, e.g., without user interaction required from the technician. In some embodiments, the child vending machine 510 transmits only a vending machine identifier. In such embodiments, the parent vending machine 510 can access files in memory 454 to obtain synchronization and configuration information to pair with the child vending machine 510 based on the identifier. The parent vending machine 505 uses the synchronization and configuration information to establish a parent-child relationship (e.g., pair) with the child vending machine 510. In the parent-child relationship, i.e., when paired, the parent vending machine 505 is able to control, monitor, or interact with, the functions of the child vending machine 510.

The child vending machine 510 transmits menu configuration information to the parent vending machine 505 automatically, e.g., without intervention from the technician (step 630). The parent vending machine 505 utilizes the menu configuration information to configure a menu such that the technician is able to program the functions of the paired vending machines 505 and 510 by entering information only in the programming menu in the UI 110 of the parent vending machine 505. The menu configuration information includes the menu information relevant only to the child vending machine such as, but not limited to, number of shelves, number of trays, size of trays, and vending machine type (e.g., snack, beverage, or other).

The parent vending machine 505 uses the menu configuration information to format a programming menu for use by the technician. Thereafter, the technician is able to program the parent vending machine 505 and child vending machine 510 as a paired vending machine (also referred herein as a satellite vending system) (step 635). The programming menu is configured to allow the technician to program, into the parent vending machine 505, products and prices for the parent vending machine 505 and the child vending machine 510. In some embodiments, the programming menu is configured to allow the technician to program discounted prices when two or more, specified products are sold together in a combo-discount vend from the pair vending system.

In the event that the parent vending machine 505 does not detect a child vending machine 510 in proximity, the parent vending machine 505 transitions to an idle operation mode (step 640). In idle operation, the parent vending machine 505 can be programmed by the technician for vending operations from the parent vending machine 505 only. The parent vending machine 505 can be programmed via the programming menu as described above. Additionally, the parent vending machine 505 can continue to look for a child vending machine 510 in proximity to pair.

In one embodiments, after reviewing which products are available, the customer selects a snack product located in the child vending machine 510 by depressing button combinations, in the keypad 225 of the parent vending machine 505, corresponding to the desired snack product (step 610). The customer inserts money into the parent vending machine 505 in an amount sufficient to pay for the selected snack product. The customer may utilize coin money, paper currency, a credit card, or any combination of the above by inserting a credit card into the credit validator, a dollar bill into the bill validator, and/or a coin into the coin insert. It will be understood that the value of the dollar bill is exemplary and that various embodiments provide for the insertion of currency in other amounts that can be detected and determined by the bill validator.

Thereafter, the parent vending machine 505 directs the child vending machine 510 to vend the selected product by transmitting a command to the controller 400 of the child vending machine 510. In some embodiments, the controller 400 in the parent vending machine 505 is configured to operate the motors, actuators and other components of the child vending machine 510 to dispense the product. In such embodiments, the child vending machine controller 400 may remain dormant.

In the event that the satellite vending system is programmed for a combination-discount vend operation, after selecting a first product, the customer either selects a discounted product or chooses not to select a discounted product. The parent vending machine 505 is operable to receive an input for the first product and an associated discounted product via the keypad 225. Additionally, the parent vending machine 505 can inform the customer that the customer may decline purchasing a discounted product by depressing a specified key (e.g., the cancel key 330).

In the event the customer selects a discounted product, the parent vending machine 505 displays (display 230) or announces (via an audible voice) the amount due for the selected product. After the customer makes a discounted product selection and inserts the amount due, the parent vending machine 505 dispenses the selected product. The customer may insert a credit card into the credit validator, a dollar bill into the bill validator, and a coin into the coin insert. Additionally, the parent vending machine 505 instructs the child vending machine 510 to vend the selected product by sending a vend command to the child vending machine 510. The vend command includes an indicator identifying which product is to be dispensed and/or a command to operate mechanism to dispense the selected snack product. Thereafter, the parent vending machine returns any change (e.g., money input in excess of the amount due) to the customer.

If the customer declines to purchase the discounted product, the parent vending machine 505 does not vend any associated products therefrom and instructs the child vending machine 510 to vend the selected product. Thereafter, the parent vending machine returns any change (e.g., money input in excess of the amount due) to the customer.

In some embodiments, the parent vending machine instructs the child vending machine 510 to vend the selected product prior to, or concurrently with, informing the customer of the listing of discounted associated products. In such embodiments, the parent vending machine 505 may store in memory 454 the discounted prices corresponding to each discounted product, and may store them until a completion event occurs. A completion event be one or more of a specified duration of time, a customer request for change due (e.g., by depressing the coin return key 332), or the customer declining purchase of the discounted (e.g., associated) product.

Figure 7:
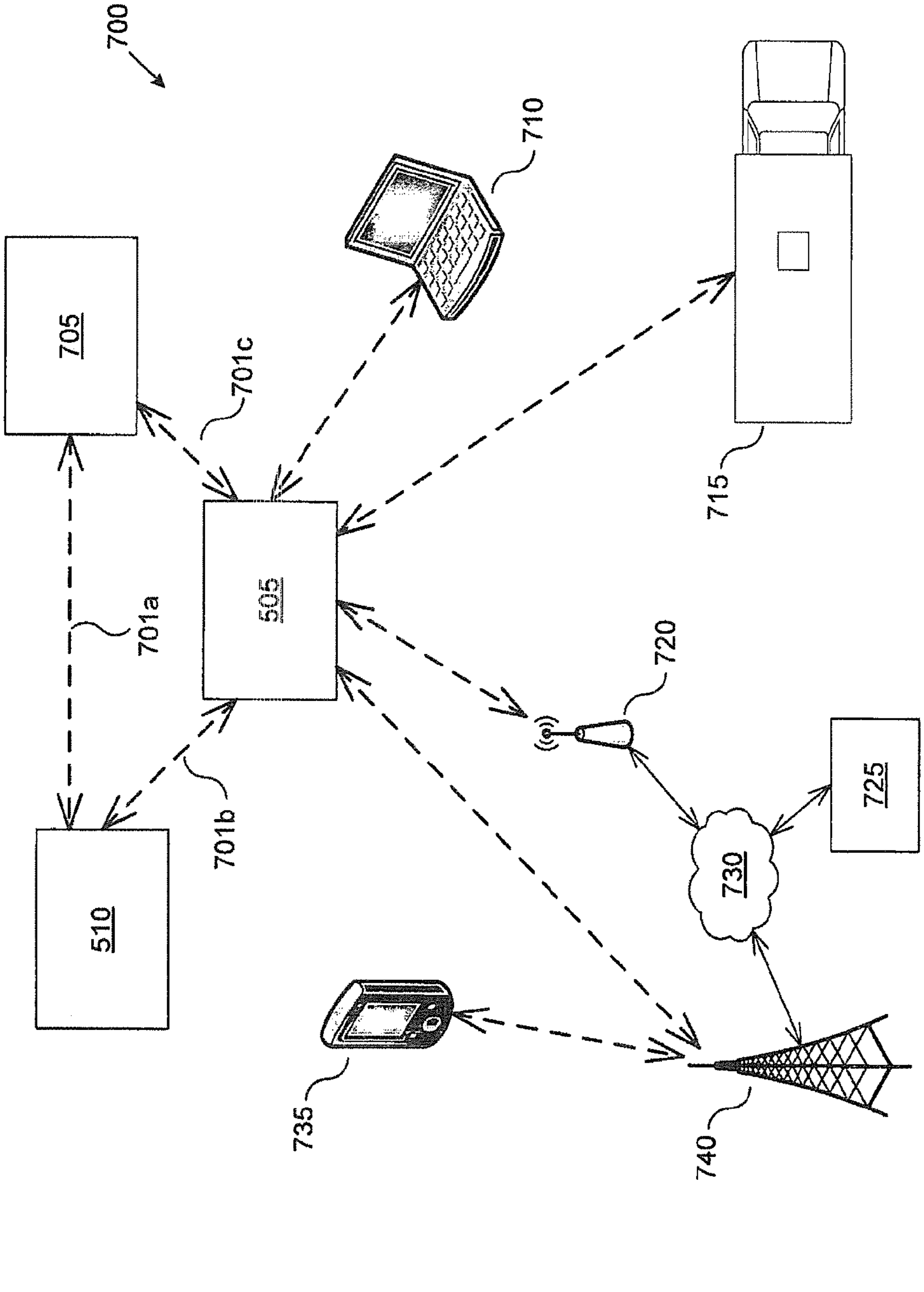
FIG. 7 is a schematic system diagram of a vending machine system having wireless communication capability according to one embodiment of the present disclosure.

FIG. 7 is a schematic system diagram of a vending machine system 700 having wireless communication capability according to embodiments of the present disclosure. The embodiment of the vending machine system 700 shown in FIG. 7 is for illustration only, and other embodiments of the vending machine system 700 could be used without departing from the scope of this disclosure.

Parent vending machines 505, child vending machine 510 and vending machine 705 communicate with each other via a communications link 701*a*, 701*b* and 701*c* (wireless or wireline). Parent vending machine 505, child vending machine 510, and vending machine 705 can be the same general structure and functionality as the vending machine 100. In some embodiments, the vending machines 505, 510 and 705 are located adjacent to each other and only the parent vending machine 505 and the vending machine 705 have a user interface: e.g., coin/currency acceptor and/or dispenser mechanisms, selection buttons, and display apparatus. A user may select a product located in the child vending machine 510 by operating the selection buttons on the parent vending machine 505 and the parent vending machine 505 will send a message to the child vending machine 510 to cause the child vending machine 510 to dispense the product. Where the child vending machine 510 has a product delivery sensing system, the child vending machine 510 may send a message to the parent vending machine 505 indicating whether the product was successfully vended, and the parent vending machine 505 may offer the opportunity to select a discounted product or return the customer's money.

The vending machines 505, 510 and 705 may exchange setup information via messages. Such setup information may include numbers of shelves, numbers of product queues on each shelf, numbers of products in each queue, product price for each product queue, or other information. In an embodiment where only one machine has a user interface, such setup information may enable that machine to provide menu and selection choices for products in the other machines.

The machines 505, 510 and 705 may also exchange operational status information. Such operational status information may include current inventory in each product queue, cumulative count of number of activations of a product queue dispenser, time since last servicing call, required maintenance, detected electronic or mechanical failures, or other information.

Other devices may additionally or alternatively communicate with one or more of the vending machines 505, 510 and 705 via communication links (wireless or wireline). A portable computer 710 communicates wirelessly with the parent vending machine 505 and may be used by a technician to provide setup information when the vending machines 505, 510 and/or 705 are installed, reconfigured or restocked. A technician in a service van 715 communicates wirelessly with the parent vending machine 505 from outside the building where the machine is located to determine whether service on one or more of the machines 505, 510 and 705 is required and, if so, what kind of service.

Where the facility in which the vending machines 505, 510 and 705 are located has a wireless access point 720, the parent vending machine 505 communicates wirelessly through the access point 720 to a device 725 coupled to the access point 720 via a network 730 (e.g., Internet or another communication network). The device 725 may be a remotely located central server or other controller for an operator of a number of such vending machines. Through the use of a device 725, the operator may achieve a benefit such as avoiding the cost of sending a technician to the location of the vending machines 505, 510 and 705 to obtain operational status information.

In some embodiments, the vending machine 505 is capable of cellular communication. In such embodiments a personal digital assistant 735 (PDA) or other cellular-capable device may 'call' the parent vending machine 505 at its cellular phone number to establish wireless communication via a base station 740 in order to send setup information or receive operational status information. Similarly, the base station 740 may be coupled to the network 730, allowing the device 725 to communicate with the parent vending machine 505 via the base station 740.

Communications between the parent vending machine 505 and any one or more of the portable computer 710, the wireless access point 720, and the vehicle 715 may be accomplished in accordance with a wireless communications protocol such as the IEEE 802.11 standard (referred to as a "WiFi standard"), the IEEE 802.16 standard (referred to as a "WiMAX standard"), or any other suitable wireless communications interface or standard. The vending machines 505, 510 and 705 may form a wireless ad hoc network or other mesh network. In other embodiments, communication between the parent vending machine 505 and the base station 740 may be conducted under another standard than a cellular wireless standard.

While only the parent vending machine 505 is shown communicating with the portable computer 710 the wireless access point 720, and the vehicle 715, it will be understood that any or all of the vending machines 505, 510 and 705 may engage in such communication. In embodiments where setup and/or operational status information are located in the parent vending machine 505, another machine, such as vending machine 705, may provide communication (wireless or wireline) (not shown) to an external device, such as the portable computer 710. In such an embodiment, status information is communicated from the parent vending machine 505 to the vending machine 705 and then communicated (wireless or wireline) to the portable computer 710. Similarly, setup commands and information are communicated from the portable computer 710 to the vending machine 705 and then communicated to the parent vending machine 505. In one or more embodiments, these communications are wireless.

In some embodiments, an operator may purchase product inventory to stock in the vending machines. In other embodiments, an operator may purchase and install machines that a manufacturer or other entity uses for consignment sales. Where such consignment products have a high price, cash sales may be impractical and the vending machine may be equipped with a card reader to scan credit or debit cards to fund the transaction. The vending machine utilizes wired or wireless communication to communicate with a transaction network, independent sales organization, acquiring bank, or other entity to authorize the transaction.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A vending machine system comprising:

a first vending machine configured to establish a communication link with a second vending machine, wherein the first vending machine is configured, upon establishment of the communication link with the second vending machine, to receive product selection information from the second vending machine and to automatically configure a programming menu for dispensing products from the second vending machine.

2. The system of claim 1, wherein the first vending machine is configured to receive menu configuration information from the second vending machine.

3. The system of claim 2, wherein a first controller in the first vending machine is configured to communicate wirelessly with a second controller in the second vending machine.

4. The system of claim 2, wherein the menu configuration information includes at least one of:

a number of shelves in the second vending machine, a number of trays in the second vending machine, a size of trays in the second vending machine, and a vending machine type of the second vending machine.

5. The system of claim 1, wherein the first vending machine is configured to automatically establish the communication link with the second vending machine when both vending machines are operational.

6. The system of claim 1, wherein the first vending machine is configured to:

transmit commands to the second vending machine to dispense a product; and trigger operation of vending components within the second vending machine.

7. The system of claim 1, wherein the first vending machine is configured to automatically configure the programming menu with product selections products available in the second vending machine.

8. The system of claim 1, wherein the programming menu is configured to receive user input that programs, into the first vending machine, products and prices for the first vending machine and for the second vending machine.

9. The system of claim 1, wherein the programming menu is configured to receive user input that programs discounted prices applicable to combination of a first product stored in the first vending machine and a second product stored in the second vending machine.

10. The system of claim 9, wherein the user input comprises a price of a product to be dispensed from the second vending machine.

11. The system of claim 1, wherein the first vending machine is further configured to automatically configure the programming menu for programming the first vending machine to control dispensing products from the second vending machine.

12. A method of operating a plurality of vending machines, comprising:

operating a first vending machine within wireless communication range of a second vending machine;

establishing a communication link at the first vending machine with the second vending machine; and upon establishment of the communication link with the second vending machine, receiving product selection information at the first vending machine from the second vending machine and automatically configuring a programming menu for use by the first vending machine to dispense products from the second vending machine.

13. The method of claim 12, further comprising:

receiving, at the first vending machine, menu configuration information from the second vending machine.

14. The method of claim 13, further comprising:

causing a first controller in the first vending machine to establish a wireless communication link with a second controller in the second vending machine, wherein the first vending machine is configured to automatically establish the wireless communication link with the second vending machine when both vending machines are operational.

15. The method of claim 12, wherein the first vending machine is configured to: transmit commands to the second vending machine to dispense a product; and trigger operation of vending components within the second vending machine.

16. The method of claim 12, wherein the first vending machine is configured to automatically configure the programming menu with product selections products available in the second vending machine.

17. A vending machine system, comprising:

a first vending machine configured to establish a communication link with a second vending machine, wherein the first vending machine is configured, upon establishment of the communication link with the second vending machine, to transmit product selection information for dispensing products from the first vending machine to the second vending machine for a programming menu to be used by the second vending machine.

18. The system of claim 17, wherein the first vending machine is configured to receive a request for menu configuration information from the second vending machine.

19. The system of claim 18, wherein a first controller in the first vending machine is configured to communicate wirelessly with a second controller in the second vending machine, wherein the first vending machine is configured to automatically establish a wireless communication link with the second vending machine when both vending machines are operational.

20. The system of claim 17, wherein the first vending machine is configured to: receive vending commands from the second vending machine to dispense a product; and initiate operation of vending components within the first vending machine in response to signals from the second vending machine.

* * * * *